(12) United States Patent　(10) Patent No.: US 7,797,477 B2
Ogawa et al.　(45) Date of Patent: *Sep. 14, 2010

(54) FILE ACCESS METHOD IN A STORAGE SYSTEM, AND PROGRAMS FOR PERFORMING THE FILE ACCESS

(75) Inventors: Junji Ogawa, Kawasaki (JP); Naoto Matsunami, Hayama (JP); Masaaki Iwasaki, Tachikawa (JP); Koji Sonoda, Sagamihara (JP); Kenichi Tsukiji, Yokohama (JP)

(73) Assignee: Hitachi, Ltd., Tokyo (JP)

(*) Notice: Subject to any disclaimer, the term of this patent is extended or adjusted under 35 U.S.C. 154(b) by 478 days.

This patent is subject to a terminal disclaimer.

(21) Appl. No.: 11/892,438

(22) Filed: Aug. 23, 2007

(65) Prior Publication Data

US 2008/0016070 A1　Jan. 17, 2008

Related U.S. Application Data

(63) Continuation of application No. 11/418,204, filed on May 5, 2006, now Pat. No. 7,293,131, which is a continuation of application No. 10/653,895, filed on Sep. 4, 2003, now Pat. No. 7,069,380.

(30) Foreign Application Priority Data

Apr. 10, 2003　(JP)　.............................. 2003-105955

(51) Int. Cl.
*G06F 12/00*　(2006.01)

(52) U.S. Cl. ............................... 711/4; 711/5; 711/112; 711/164; 711/156; 711/E12.019; 707/783; 707/705; 707/802

(58) Field of Classification Search .................... None
See application file for complete search history.

(56) References Cited

U.S. PATENT DOCUMENTS

| | | | |
|---|---|---|---|
| 5,745,748 A | 4/1998 | Ahmad et al. | |
| 5,924,087 A | 7/1999 | Takahashi et al. | |
| 6,138,126 A | 10/2000 | Hitz et al. | |
| 6,457,017 B2 | 9/2002 | Watkins et al. | |
| 6,556,998 B1 | 4/2003 | Mukherjee et al. | |
| 6,785,693 B2 | 8/2004 | DeLorme et al. | |
| 2001/0047351 A1 | 11/2001 | Abe | |

(Continued)

FOREIGN PATENT DOCUMENTS

DE　10032962　3/2001

(Continued)

*Primary Examiner*—Reginald G Bragdon
*Assistant Examiner*—Arvind Talukdar
(74) *Attorney, Agent, or Firm*—Brundidge & Stanger, P.C.

(57) ABSTRACT

In order to manage the various types of attribute information within the storage system, the storage system includes the following databases within a file-access controlling memory: a database for managing index information for managing contents of the files, and an index retrieval program, a database for managing the attribute information on the files, and a database for managing storage positions of blocks configuring a file. When the storage system receives an access request to a file, the utilization of these databases allows the storage system to make the access to the access-target file.

12 Claims, 9 Drawing Sheets

U.S. PATENT DOCUMENTS

| | | |
|---|---|---|
| 2001/0054042 A1 | 12/2001 | Watkins et al. |
| 2002/0059263 A1 | 5/2002 | Shima et al. |
| 2002/0062301 A1 | 5/2002 | Rudoff et al. |
| 2002/0065835 A1 | 5/2002 | Fujisaki |
| 2003/0023784 A1 | 1/2003 | Matsunami et al. |
| 2003/0159006 A1 | 8/2003 | Frank et al. |
| 2004/0006565 A1 | 1/2004 | Shmueli |
| 2004/0088313 A1 | 5/2004 | Torres |
| 2004/0162816 A1 | 8/2004 | Irle et al. |
| 2004/0167896 A1 | 8/2004 | Eakin |
| 2004/0199566 A1 | 10/2004 | Carlson et al. |

FOREIGN PATENT DOCUMENTS

| | | |
|---|---|---|
| JP | 05-342152 | 12/1993 |
| JP | 10-040147 | 2/1998 |
| JP | 2001-334254 | 12/2001 |
| JP | 2002-049638 | 2/2002 |
| JP | 2002-222105 | 8/2002 |
| WO | 00/77606 | 12/2000 |
| WO | 02/25870 | 3/2002 |
| WO | WO/03067462 | 8/2003 |

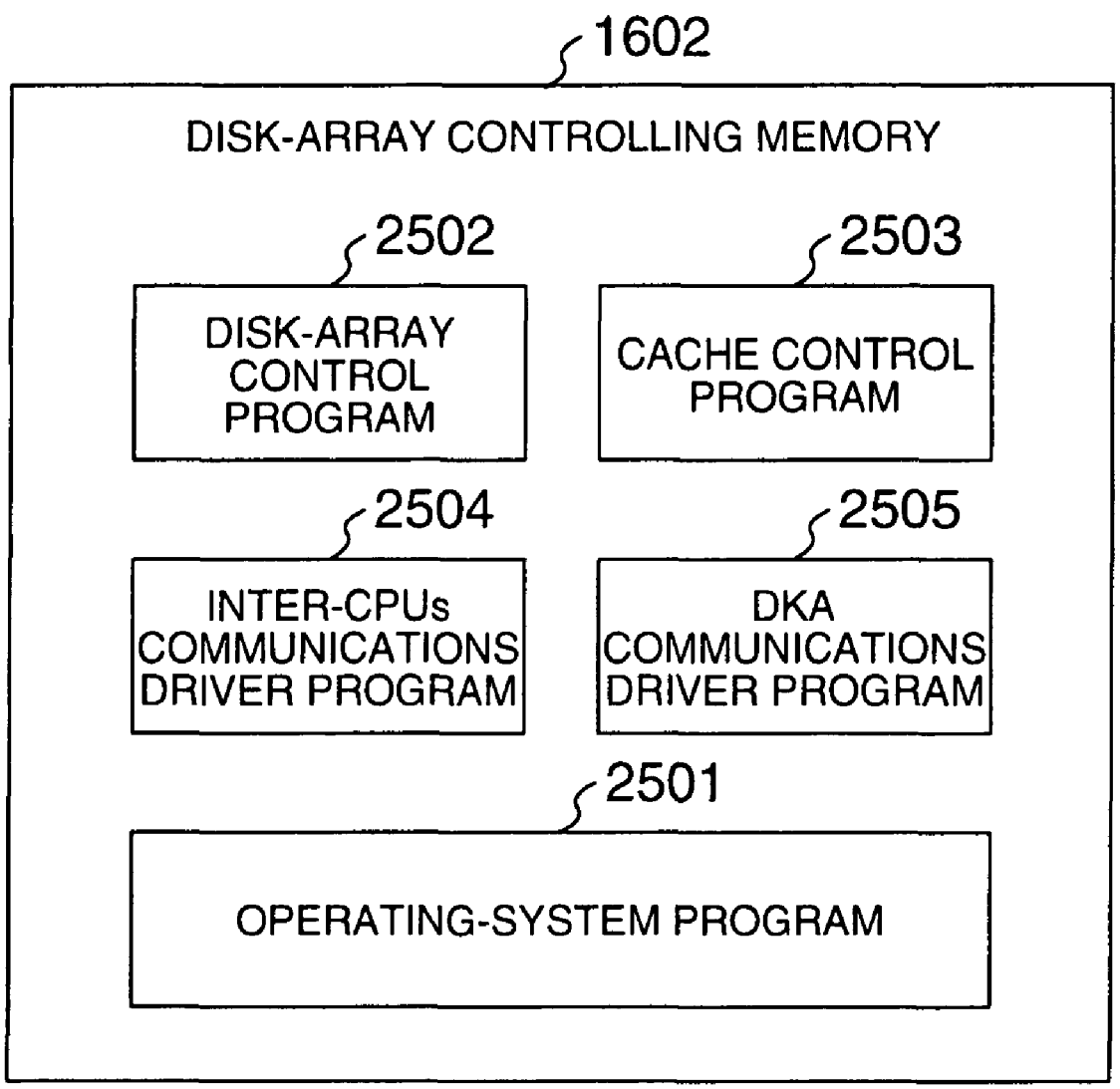

FIG. 7

| ATTRIBUTE | CONTENTS | ATTRIBUTE | CONTENTS |
|---|---|---|---|
| FILE NAME | abc.txt | PERMISSION | DIVISION 4: R—, SECTION 2: RW—··· |
| DIRECTORY NAME | mydoc | CREATION POINT-IN-TIME | 2003/1/2 3:45 |
| FILE TYPE | NORMAL FILE | UPDATE POINT-IN-TIME | 2003/2/3 4:56 |
| TYPE | TEXT | ACCESS POINT-IN-TIME | 2003/3/4 1:23 |
| STATE | IN THE OPEN | CREATOR | TANAKA |
| | | OWNER | TANAKA |
| TITLE | ABC | UPDATOR | SATO |
| GENRE | TECHNICAL DOCUMENT | VIEWER | SATO |
| COMMENT | ABOUT ABC | CREATION GROUP | SECTION 2 |
| | | UPDATE GROUP | SECTION 2 |
| FILE SIZE | 1MB | VIEW GROUP | DIVISION 4 |
| PAGE NUMBER | 100 PAGES | | |
| CHARACTER NUMBER | 20000 | DATA LIFE-CYCLE | UPDATE TIME-PERIOD |
| LINE NUMBER | 500 | IMPORTANCE DEGREE | HIGH |
| LENGTH | — | STORAGE-DESTINATION MEDIA | HIGH-SPEED DISKS |
| SIZE | — | DATA-HOLDING-UNIT RESIDENT INFORMATION | NO RESIDENCE IS SPECIFIED |
| | | | |
| CREATION APPLICATION | EDITOR | USER-DEFINITION ATTRIBUTE 1: PRICE | 10000 |
| UPDATE APPLICATION | EDITOR | USER-DEFINITION ATTRIBUTE 2 | |
| DISPLAY APPLICATION | PAGER | ⋮ | |

FIG. 8

| FILE NAME | INDEX (CONTENTS) | ATTRIBUTE | ATTRIBUTE INFORMATION |
|---|---|---|---|
| abc.txt | DATA | | |
| | RETRIEVAL | | |
| | FILE | | |
| | DATABASE | | |
| | | TYPE | TEXT |
| | | PAGE NUMBER | 100 PAGES |
| | | DATA-HOLDING-UNIT RESIDENT INFORMATION | NO RESIDENCE IS SPECIFIED |
| ⋮ | ⋮ | ⋮ | ⋮ |
| def.mpg | CREATOR:TANAKA | | |
| | GENRE: RECORD | | |
| | | LENGTH | 12m34s |
| ⋮ | ⋮ | ⋮ | ⋮ |

2303

FILE ACCESS METHOD IN A STORAGE SYSTEM, AND PROGRAMS FOR PERFORMING THE FILE ACCESS

CROSS-REFERENCES

This is a continuation application of U.S. Ser. No. 11/418,204, filed May 5, 2006 (now U.S. Pat. No. 7,293,131), which is a continuation application of U.S. Ser. No. 10/653,895, filed Sep. 4, 2003 (now U.S. Pat. No. 7,069,380).

BACKGROUND OF THE INVENTION

The present invention relates to a storage system used in a computer system. More particularly, it relates to an access to a file stored in the storage system, or the management of the file stored therein.

US2003/0023784A1 (corresponding to JP-A-2003-044332) has disclosed a storage system including the following configuration components: a disk controller for accepting an access via a storage area network (which, hereinafter, will be referred to as "SAN"), a file server for accepting an access via a local area network (which, hereinafter, will be referred to as "LAN"), a disk device connected to the disk controller and the file server via a connection device and including a disk pool, and a disk-pool management device for managing the relationship among the disk controller, the file server, and the disk device.

A client, which tries to establish a connection with the storage system via the LAN, can access the storage system with a file I/O interface.

SUMMARY OF THE INVENTION

There has been an increase in the amount of data of a file stored into the storage system. In accompaniment with this increase in the amount of data, it is becoming more and more difficult to make a simple and high speed access to the file, i.e., the access target. Also, files used in the computer system are rapidly increasing in number. At present, however, the files are stored in the storage system as mere non-structured files. As a result, the management form of the files stored in the storage system is left to be memorized by each user. This has resulted in a problem from the viewpoint of attainability to the files.

Also, plural pieces of attribute information of a file become important in identifying the file. On each file-type basis, there exist the attribute information such as importance, requested performance, and requested storage cost. Also, plural pieces of attribute information vary with a lapse of time. No related art has disclosed a technology for allowing the storage system to manage the large variety types of attribute information on the file, and the dynamically varying attribute information on the file as the present invention.

Accordingly, it is an object of the present invention to provide a technology for allowing an enhancement in the access performance to a file stored in the storage system.

Also, it is another object of the present invention to provide a storage system that makes it possible to manage the various types of attribute information included in the file.

For this object, the storage system stores the attribute information on a file stored into the storage system, then accessing the file by utilizing the attribute information. Also, the storage system manages, as an index, the attribute information or a part of data in the file. Moreover, by using information included in an access request to the file as a key, the storage system retrieves the index, then accesses the file data extracted by this retrieval.

Other objects, features and advantages of the invention will become apparent from the following description of the embodiments of the invention taken in conjunction with the accompanying drawings.

BRIEF DESCRIPTION OF THE DRAWINGS

FIG. 6 is a drawing for illustrating one example of programs stored in a disk-array controlling memory that the NAS channel adapter includes;

FIG. 7 is a drawing for illustrating one example of a file-attribute management table;

FIG. 8 is a drawing for illustrating one example of an index management table.

DETAILED DESCRIPTION OF THE INVENTION (1) System Configuration

Figure 1:
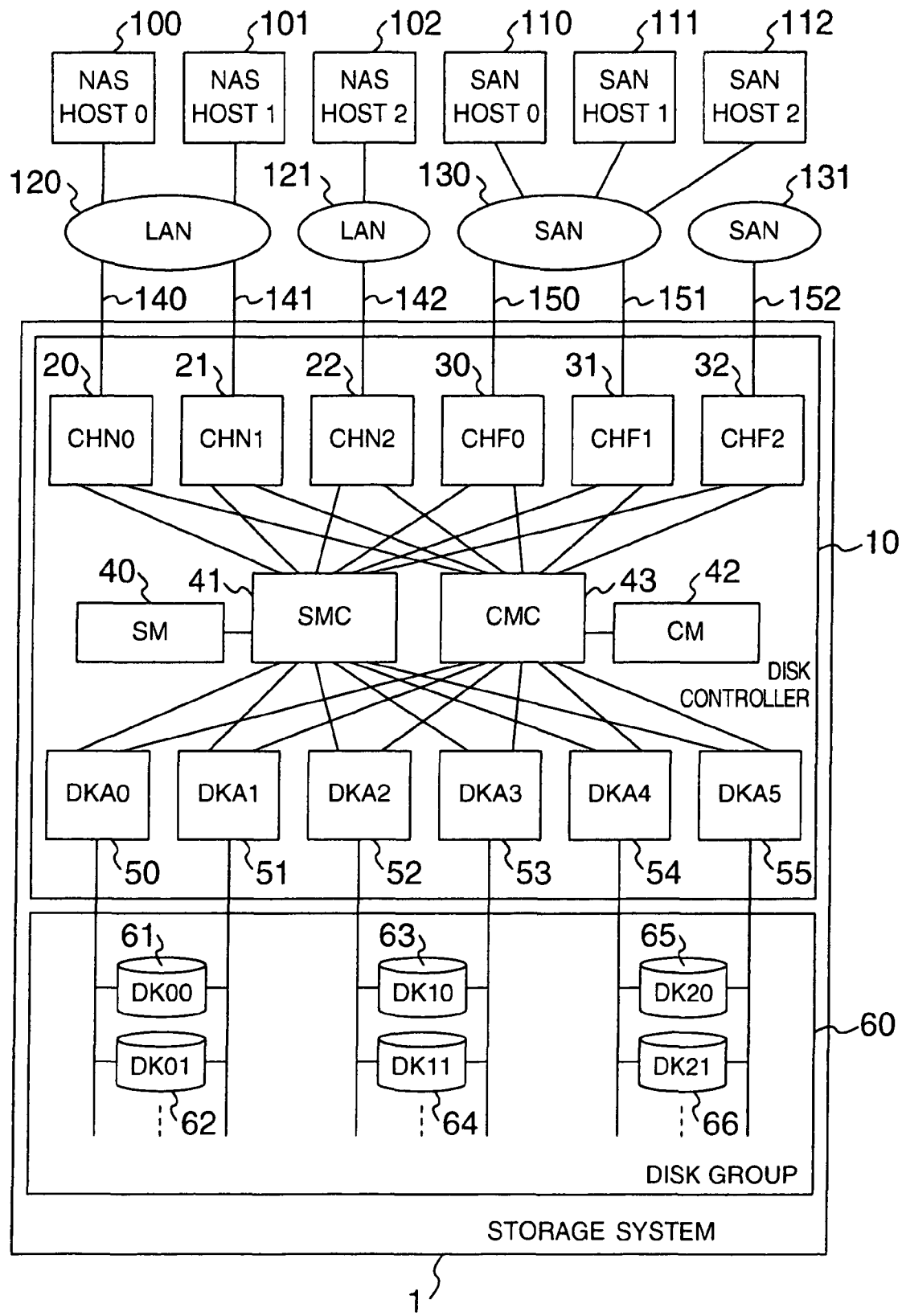
FIG. 1 is a drawing for illustrating one example of the configuration of a computer system to which the present invention is applied.

FIG. 1 is a drawing for illustrating one example of a computer system to which the present invention is applied. A storage system 1 is a disk array including a disk controller 10 and a disk group 60. NAS (: Network Attached Storage) hosts 100 to 102 are computers that establish a connection with the storage system 1 with a file I/O interface via a LAN 120 or a LAN 121 and that access a file stored in the storage system 1. SAN (: Storage Area Network) hosts 110 to 112 are computers that establish a connection with the storage system 1 with a block I/O interface via a SAN 130.

Within the disk controller 10, NAS channel adapters (which, hereinafter, will be referred to as "CHNs") 20 to 22 are interface control devices connected to the NAS hosts 100 to 102 with the file I/O interface via the LAN 120 or the LAN 121. Fibre channel adapters (which, hereinafter, will be referred to as "CHFs") 30 to 32 are interface control devices connected to the SAN hosts 110 to 112 with the block I/O interface via the SAN 130. Hereinafter, the CHNs and the CHFs will together be referred to as "channel adapters (: CHs)".

In addition to the CHNs and the CHFs, the disk controller 10 further includes the following components: Disk adapters (which, hereinafter, will be referred to as "DKAs") 50 to 55, a shared memory (which, hereinafter, will be referred to as "SM") 40, a cache memory (which, hereinafter, will be referred to as "CM") 42, a shared-memory controller (which, hereinafter, will be referred to as "SMC") 41, and a cache-memory controller (which, hereinafter, will be referred to as "CMC") 43. The shared-memory controller (: SMC) 41, which is connected to the CHNs 20 to 22, the CHFs 30 to 32, the DKAs 50 to 55, and the SM 40, controls data transfer between the CHNs 20 to 22, the CHFs 30 to 32, or the DKAs 50 to 55, and the SM 40. The cache-memory controller (: CMC) 43, which is connected to the CHNs 20 to 22, the CHFs 30 to 32, the DKAs 50 to 55, and the CM 42, controls data transfer between the CHNs 20 to 22, the CHFs 30 to 32, or the DKAs 50 to 55, and the CM 42.

The disk group 60 includes plural disks 61 to 66. Each of the plural disks 61 to 66 is connected to any one of the disk adapters (: DKAs) 50 to 55. A configuration is also allowable where, as illustrated in FIG. 1, each disk is connected to plural disk adapters. Each of the DKAs 50 to 55 controls the disks connected to itself.

The LAN 120 and the LAN 121 are networks for connecting the CHNs 20 to 22 with the NAS hosts 100 to 102. The SAN 130 is a network for connecting the CHFs 30 to 31 with the SAN hosts 110 to 112. In general, the Fibre Channel is used as a SAN. However, the IP network may be used as the SAN, and the iSCSI where the SCSI protocol is executed on the IP network may be utilized among appliances connected to the SAN. It is assumed that, in the present embodiment, a SAN 131 is a one specifically designed for establishing a connection among plural storage systems, and that none of the SAN hosts is connected to this SAN.

In the storage system 1, all the CHs can access the CM 42 and the disks 61 to 66 via the SMC 41 or the CMC 43. Also, the storage system 1 is a one including both of the following interfaces: The SAN interfaces for establishing a connection with the SAN hosts 110 to 112, i.e., the CHFs, and the NAS interfaces for establishing a connection with the NAS hosts 100 to 102, i.e., the CHNs. Incidentally, the technology according to the present invention can also be applied similarly to the case where the storage system 1 includes only the NAS interfaces (i.e., the CHNs).

(2) Outside Configuration of Storage System

Figure 2:
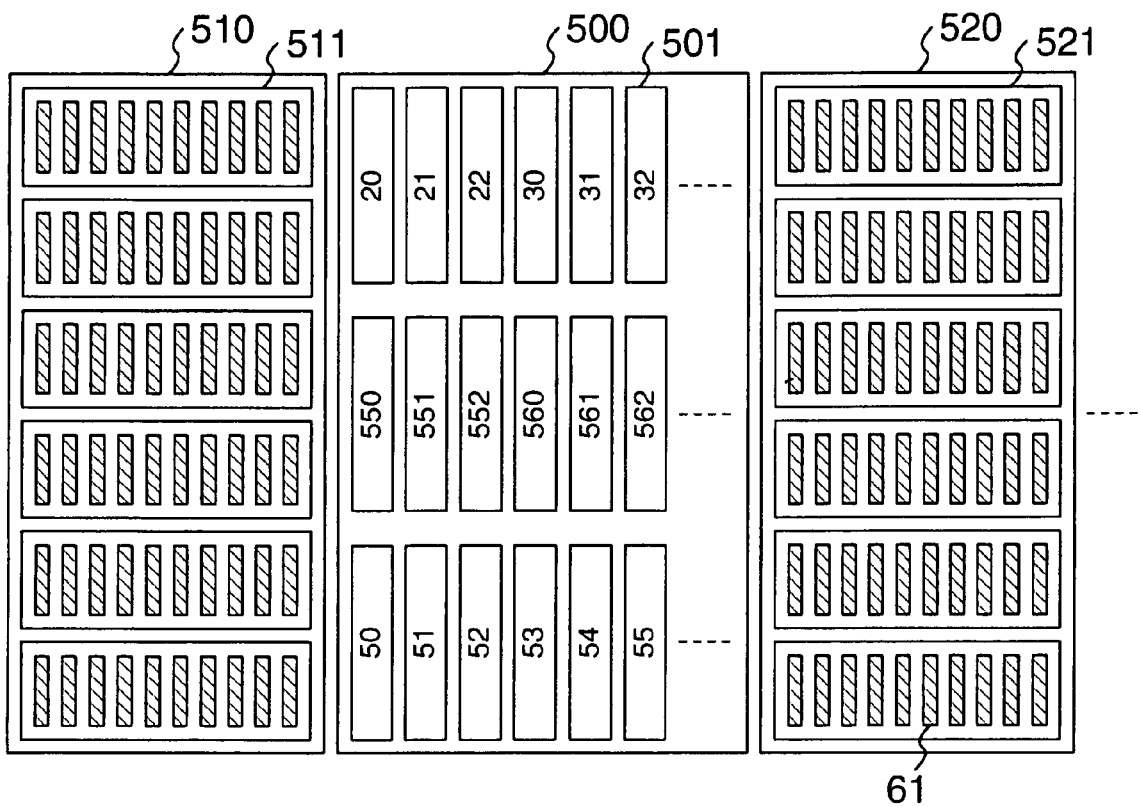
FIG. 2 is a drawing for illustrating one example of the outside appearance of a storage system.

FIG. 2 is a drawing for illustrating one example of the outside appearance of the storage system 1. A disk controller unit 500 includes plural slots 501. A board is stored into each slot 501. Here, the configuration components or component included in the disk controller 10, i.e., the CHNs 20 to 22, the CHFs 30 to 32, the DKAs 50 to 55, the SMC 41, the CMC 43, the SM 40, or the CM 42, are or is formed onto this board. Disk units 510 and 520 store a storage group 511 or a storage group 521 including the plural disks 61, or the like.

The SM 40, in fact, includes plural controller boards 550 to 552, and each controller board is stored into the slot within the disk controller unit 500. Also, the CM 42 includes plural cache boards 560 to 562, and each cache board is stored into the slot within the disk controller unit 500. A user of the storage system 1 increases/decreases the number of the controller boards or that of the cache boards. This allows the user to configure the SM or the CM that exhibits a desired storage capacity.

In addition to the controller boards, i.e., adapter boards configuring the SM, and the cache boards, i.e., adapter boards configuring the CM, an adapter board onto which the CHNs, the CHFs, or the DKAs are formed is also stored into each slot 501 of the disk controller unit 500. In the present embodiment, the configuration of the slots 501, the size of the adapter boards, and the configuration of connectors are made constant and equal regardless of the types of the interfaces, thereby maintaining the compatibility. Consequently, in the disk controller unit 500, it becomes possible to fill an arbitrary slot 501 with an arbitrary adapter board regardless of the types of the interfaces. Also, the user of the storage system 1 freely combines the number of the adapter boards onto which the CHNs are formed, that of the ones onto which the CHFs are formed, and that of the ones onto which the DKAs are formed, then filling the slots of the disk controller unit 500 with the adapter boards thus combined. This allows the user to configure the disk controller 10 that matches user's own needs.

(3) Configuration of NAS Channel Adapter (: CHN) Board

Figure 3:
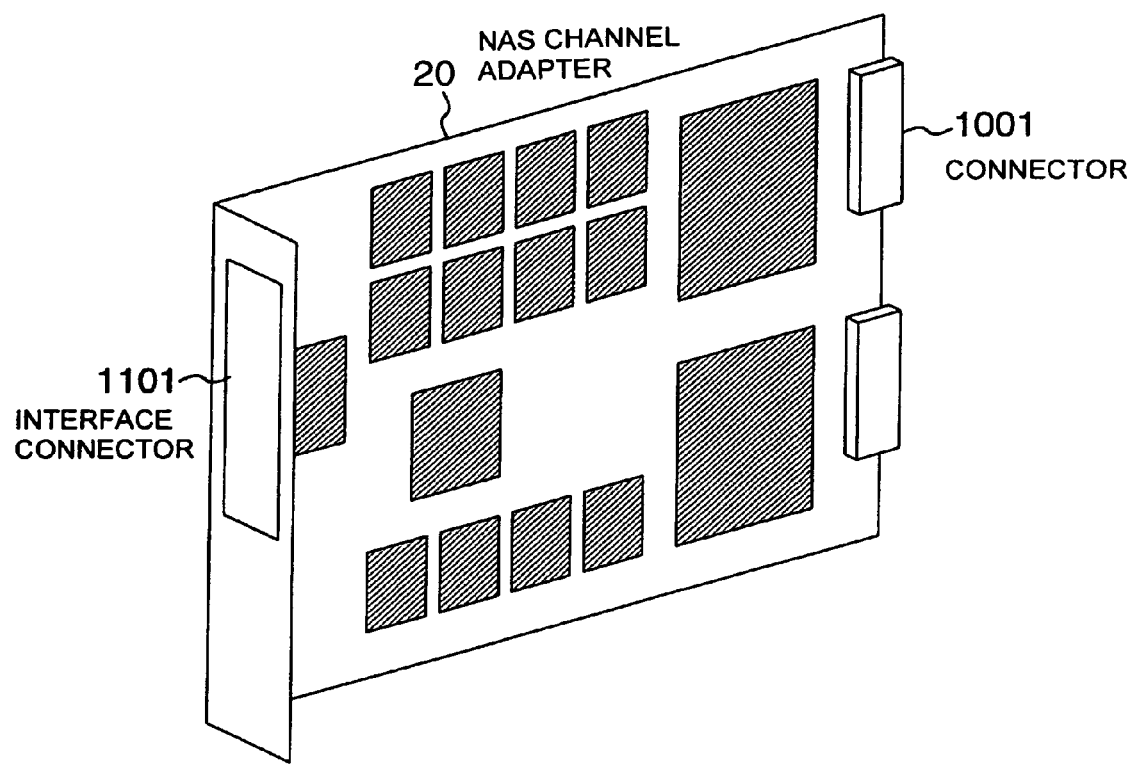
FIG. 3 is a drawing for illustrating one example of the outside appearance of a channel adapter.

FIG. 3 is a drawing for illustrating one example of the configuration of the adapter board onto which the CHNs are formed. Connectors 1001 are connected to the connectors that the disk controller unit 500 has. In the present embodiment, as described above, the adapter board onto which the CHNs are formed and the one onto which the CHFs are formed have the connectors of the same configuration. An interface connector 1101, which corresponds to the Ethernet (i.e., trade mark of the LAN standard), is connectable to the Ethernet (: trade mark). Incidentally, in the case of the adapter board onto which the CHFs are formed, the interface connector 1101 corresponds to the Fibre Channel, and is configured to be connectable to the Fibre Channel.

(4) Internal Configuration of NAS Channel Adapter (: CHN) Board

Figure 4:
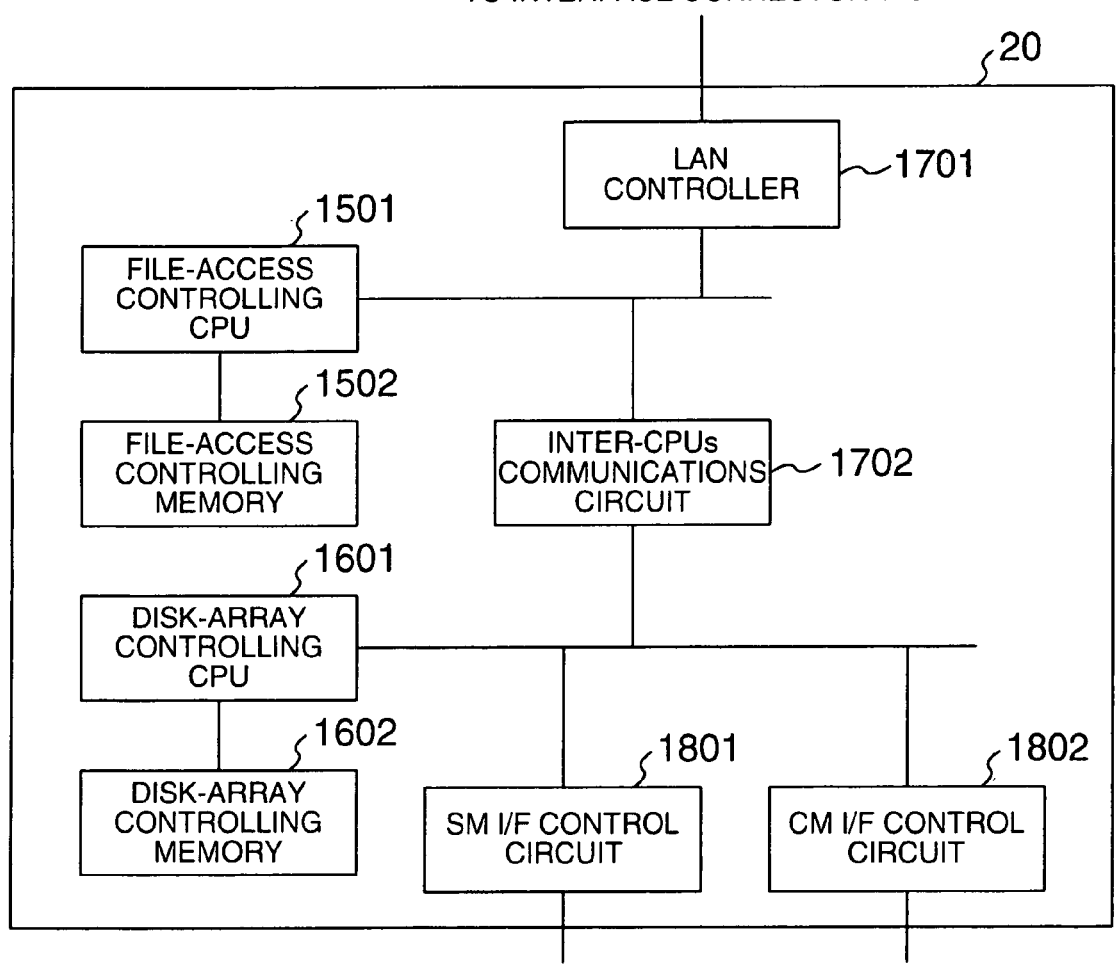
FIG. 4 is a drawing for illustrating one example of the configuration of a NAS channel adapter.

FIG. 4 is a drawing for illustrating one example of the internal configuration of each of the CHNs 20 to 22.

Each of the CHNs 20 to 22 includes the following configuration components: A file-access controlling CPU 1501, a file-access controlling memory 1502, a disk-array controlling CPU 1601, a disk-array controlling memory 1602, a LAN controller 1701, an inter-CPUs communications circuit 1702, a SM interface control circuit 1801, and a CM interface control circuit 1802.

The file-access controlling CPU 1501 is a processor for controlling a file-access processing for accessing the data in files stored in the storage system 1. The file-access controlling memory 1502, which is connected to the file-access controlling CPU 1501, stores therein programs to be executed by the file-access controlling CPU 1501 and control data to be utilized by the file-access controlling CPU 1501.

A LAN controller 1701 is connected to the LAN via the interface connector 1101.

The disk-array controlling CPU 1601 is a processor for controlling the disk group 60 so as to control accesses to the disks that the disk group 60 includes. The disk-array controlling memory 1602, which is connected to the disk-array controlling CPU 1601, stores therein programs to be executed by the disk-array controlling CPU 1601 and control data to be utilized by the disk-array controlling CPU 1601.

The SM I/F control circuit 1801 is a circuit for controlling an access made from each of the CHNs 20 to 22 to the SM 40. The CM I/F control circuit 1802 is a circuit for controlling an access made from each CHN to the CM 42. The inter-CPUs communications circuit 1702 is a circuit for allowing the file-access controlling CPU 1501 to perform communications with the disk-array controlling CPU 1601 in order to access the disks that the disk group 60 includes.

Incidentally, in the present embodiment, there has been indicated the example of each CHN having an asymmetric-type multi-processor configuration where the two processors, i.e., the file-access controlling CPU 1501 and the disk-array controlling CPU 1601, are mounted thereon. However, of course, it is also possible to implement a CHN having a configuration where the file-access control and the disk-array control are executed with a single processor. Also, it is possible to implement a CHN having a symmetric-type multi-processor configuration where the file-access control and the disk-array control are executed with two or more processors on an equal basis.

Additionally, each of the CHFs 30 to 32 has basically the same configuration as that of each CHN illustrated in FIG. 4, except the following point: The upper-half configuration components in FIG. 4, i.e., the LAN controller 1701, the file-access controlling CPU 1501, the file-access controlling memory 1502, and the inter-CPUs communications circuit 1702, are replaced by fibre channel controllers.

(5) Configuration of File-Access Controlling Memory

Figure 5:
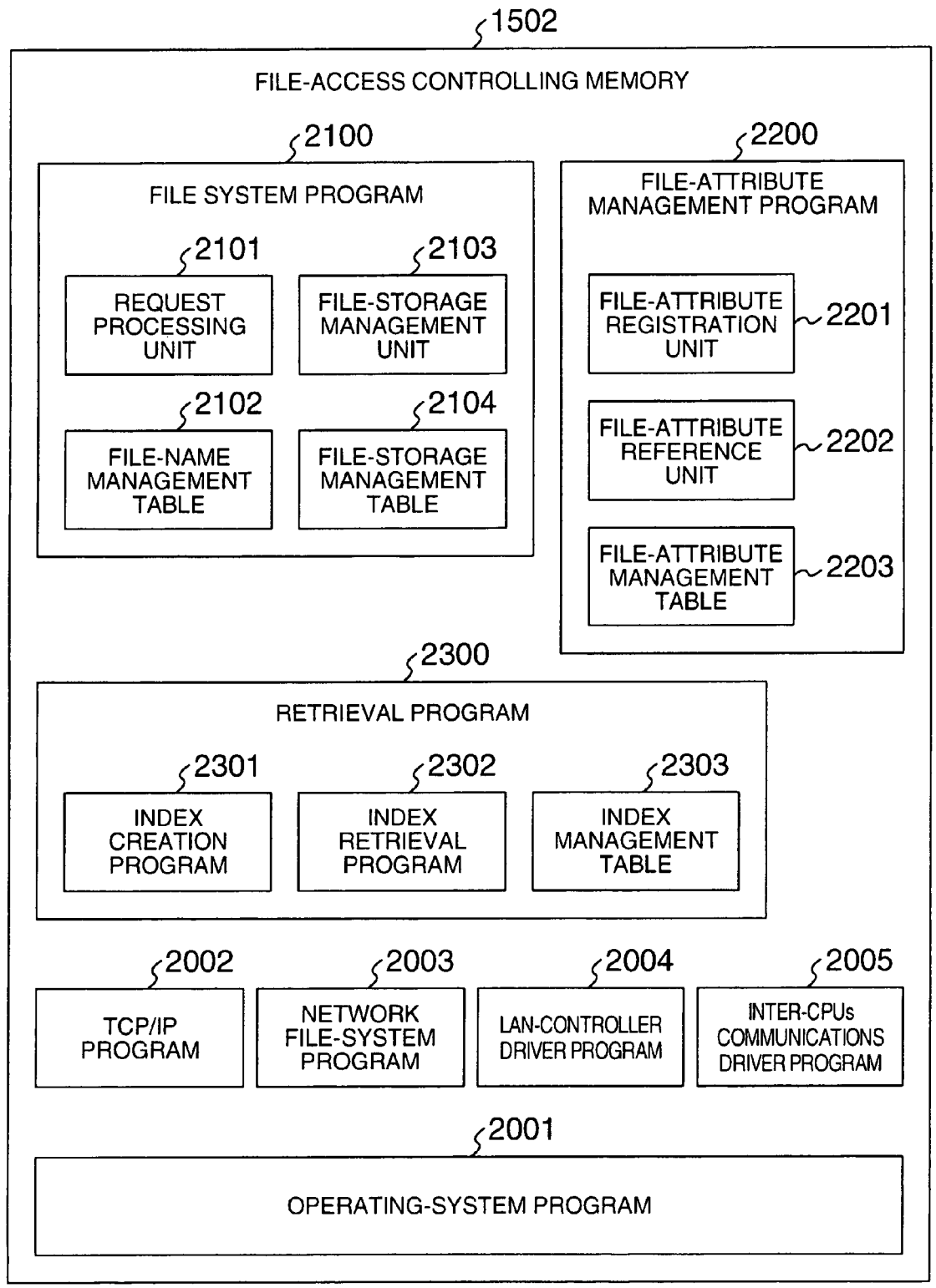
FIG. 5 is a drawing for illustrating one example of programs or data stored in a file-access controlling memory that the NAS channel adapter includes.

FIG. 5 is a drawing for illustrating contents of the programs and the control data stored in the file-access controlling memory 1502 that each of the CHNs 20 to 22 includes.

An operation-system program 2001 is a program that is used for managing the entire programs to be executed by the file-access controlling CPU 1501, and that is used for the input/output control over external interfaces of the file-access controlling CPU 1501. A TCP/IP program 2002 is used for controlling the TCP/IP, i.e., the communications protocol on the LANs. A network file-system program 2003 is used for controlling the NFS, the CIFS, or the like, i.e., the protocol for providing the NAS host 100 with the files stored into the storage system 1. A LAN-controller driver program 2004 is used for controlling the LAN controller 1701. An inter-CPUs communications driver program 2005 is used for controlling the inter-CPUs communications circuit 1702 for performing the communications between the file-access controlling CPU 1501 and the disk-array controlling CPU 1601.

A file system program 2100 is used for managing the files stored into the storage system 1. The file system program 2100 includes the following configuration components: A request processing unit 2101 for receiving, from the NAS host, an access request to a file and executing an access processing to the file, a file-storage management unit 2103 for treating the file as blocks to determine storage positions of the blocks on a disk, and for managing the storage positions, a file-storage management table 2104 for managing addresses indicating the storage positions on the disk into which the blocks are stored, and a file-name management table 2102 for managing the relationship between a file name and the file-storage management table 2104 of the corresponding file that the file name indicates.

A file-attribute management program 2200 is used for managing attribute information that a file has. The file-attribute management program 2200 includes the following configuration components: a file-attribute registration unit 2201 for creating and registering the attribute information on the file, a file-attribute reference unit 2202 for receiving a reference request for the attribute information on the file, and returning back the requested attribute information to a request source, and a file-attribute management table 2203 for registering therein the attribute information indicating the attributes that the file has. Executing the repository management of the file-attribute management table 2203 makes it possible to facilitate the management of the attribute information on the file.

A retrieval program 2300 is used for retrieving data and metadata that a file has. Here, the data refers to data stored in the file that becomes the target of an access from the NAS host or the SAN host. The metadata refers to management data used for managing the file, e.g., the file size, the file creation point-in-time, information defining an access limit to the file, and the storage position of the file in the file system. The retrieval program 2300 includes the following configuration components: An index creation program 2301 for creating, from the data and the metadata of the file, an index that is referred to when retrieving the file, an index retrieval program 2302 for executing the retrieval of the file by using the index, and an index management table 2303 where a file name and an index that is referred to when retrieving the corresponding file are registered in a related manner to each other.

Incidentally, the configuration of the programs and the control data stored in the file-access controlling memory 1502 is not limited to the example illustrated in FIG. 5. The programs and the control data to be stored in the file-access controlling memory 1502 can assume a free configuration, as long as the free configuration makes it possible to implement a function that is basically the same as the one that the programs and the control data illustrated in FIG. 5 can implement. An example of this free configuration is the case where the file-attribute management program 2200 is one of the program modules that the file system program 2100 includes.

In the present embodiment, the execution of the file system program 2100 allows the storage position of file data within a disk and the corresponding file name to be managed in a related manner to each other. The execution of the file-attribute management program 2200 allows a file name and the attribute information on the corresponding file to be managed in a related manner to each other. The execution of the retrieval program 2300 allows a file name and an index that is referred to when retrieving the corresponding file to be managed in a related manner to each other. Moreover, using these three programs, the storage system 1 executes the access processing in response to a file accessing request received from the NAS host.

(6) Configuration of Disk-Array Controlling Memory

FIG. 6 is a drawing for illustrating the programs stored in the disk-array controlling memory 1602 that each of the CHNs 20 to 22 includes.

An operation-system program 2501 is used for managing the entire programs stored in the disk-array controlling memory 1602 and for performing the input/output control. A disk-array control program 2502 is used for managing the inside of the disk array 60, and for performing the processing control over an access request from the file-access controlling CPU 1501 or the disk-array controlling CPU 1601. An inter-CPUs communications driver program 2504 is used for controlling the inter-CPUs communications circuit 1702 for performing the communications between the file-access controlling CPU 1501 and the disk-array controlling CPU 1601. A cache control program 2503 is used for performing the controls about the CM, e.g., management of data stored in the CM 42 and cache hit/miss judgement. A DKA communications driver program 2505 is used for performing a control at the time when, when accessing a logical unit (which, hereinafter, will be referred to as "LU"), i.e., a storage region within the disk group 60, communications are performed with a DKA for controlling the disks that configure the LU.

(7) File-Attribute Information Table

FIG. 7 is a drawing for illustrating one example of the file-attribute information table 2203. The file-attribute information table 2203 stores therein the attribute information set for each file on each file basis.

The plural pieces of attribute information on a file are as follows:

The "file name" indicates the name of a file to be accessed. The "directory name" indicates the name of a directory in which the file is stored. The "file type" indicates a type of the file on the file system, e.g., normal file or link. The "type" indicates a type of the file's contents, e.g., text, stationary picture, or motion picture. The "state" indicates in what state the file is maintained, e.g., in the open.

The "title" indicates the title of the file. The "genre" indicates a genre of the file, e.g., report or technical document. The "comment" indicates a comment that a "user" or an "application" had attached to the file at the time of having created the file. Additionally, the "user" refers to the user of a client computer connected to the NAS host via the LAN. The "application" refers to a program executed on the client computer that the user had used at the time of having created the file. Using the application to be executed on the client computer, the user of the client computer creates the file, then attaching the comment thereto. Otherwise, the application to be executed on the client computer attaches the comment thereto. After that, the user or the application is capable of requesting the NAS host to store the file into the storage system 1 via the NAS host.

The "file size" indicates a size of the file in byte unit. The "page number" indicates a page number in the case where the file is a one such as a document file including plural pages. The "character number" indicates a character number in the case where the file is the one such as the document file including characters. The "line number" indicates a line number in the case where the file is the one such as the document file including plural lines. The "length" indicates a reproduction time period in the case where the file is a one such as a voice file or a motion-picture file having the concept or characteristic of the reproduction time period. The "size" indicates a size in the case where the file is a one such as an image file or the motion-picture file having the concept or characteristic of a display size.

The "creation application" indicates the application used at the time of having created the file. The "update application" indicates an application used at the time of updating the file. The "display application" indicates an application used at the time of displaying the file.

The "permission" indicates an access permission range with respect to the file. The "creation point-in-time" indicates a point-in-time at which the file had been created. The "update point-in-time" indicates a point-in-time at which the file had been updated. The "access point-in-time" indicates a point-in-time at which the file had been accessed. The "creator" indicates the user name of the user of the client computer which had created the file. The "owner" indicates the user name of a client computer which has owned the file. The "updator" indicates the user name of a client computer which had updated the file. The "viewer" indicates the user name of a client computer which had viewed the file. The "creation group" indicates a user assembly or a user group to which the creator had belonged at the time of having created the file. The "update group" indicates a user assembly or a user group to which the updator had belonged at the time of having updated the file. The "view group" indicates a user assembly or a user group to which the viewer had belonged at the time of having viewed the file.

The "data life-cycle" is information for indicating, in the data life-cycle including plural time periods, to which time period the file belongs at present. Here, examples of the plural time periods are as follows: A "creation time period" during which a file is created, an "update time period" during which updating the file data occurs so frequently, a "reference time period" during which, after the update time period, updating the file is decreased in number and making references to the file mainly occurs, and a "storage time period" during which, after the reference time period, making the access requests to the file scarcely occurs. Incidentally, the data life-cycle need not necessarily be a one having the above-described four time periods, but may be a one having another time period as well. The storage system 1 determines to which time period a file belongs, using a predetermined method and based on the following information: a frequency of the accesses, a time that has elapsed from the final access, the contents of the file (e.g., the genre of the file indicating whether the file is a mail or a receipt), and the like. Accordingly, files belonging to one and the same time period can be considered to exhibit a characteristic common thereto. Consequently, it can be considered that the NAS host will make accesses frequently to a file belonging to, e.g., the update time period. This allows the storage system 1 to perform the following controls using the life-cycle information: storing this file into a storage region to which a high speed access is executable, causing data in this file to be resident in the CM 42, creating the index so that this file will be able to be retrieved with a higher priority when retrieving this file, and the like. Additionally, the index creation processing will be explained later.

The "importance degree" indicates an importance degree set to the file. The "storage-destination media" indicate the attributes of a storage region into which the file is to be stored. The "data-holding-unit resident information" indicates whether or not to cause blocks configuring the file to reside in the CM 42, or whether or not to cause the blocks to reside therein with a higher priority. Incidentally, the storage system 1 may determine the importance degree, the storage-destination media, and the data-holding-unit resident information so that these plural pieces of attribute information will match a condition predetermined in correspondence with the data life-cycle, and then may set up the determined attribute information into the file-attribute management table 2203. Also, the user of the NAS host or the client computer may transmit, to the storage system 1, an access request that specifies the file's importance degree, the storage-destination media, and the data-holding-unit resident information. Then, in accordance with the access request received, the file-access controlling CPU 1501 of the storage system 1 may register these attribute information into the file-attribute management table 2203.

The "user-definition attributes" indicate attribute information that the user of the client computer specifies on an independent and unique basis. As the user-definition attribute information, e.g., a price of the file charged when using the file or the like is registered.

The information indicated so far are just one example of the attribute information that a file has. Other than the above-described attribute information, a variety of attribute information can be defined as the user-definition attributes so as to be stored into the file-attribute management table 2203. Also, the file-attribute management table 2203 need not necessarily include all of the above-described attribute information, but can include only necessary attribute information. Incidentally, the attribute information includes both of the following information: the information such as the file name, the directory name, and the state, which become necessary for making an access to the file from each CHN, and the information such as the title, the genre, the page number, and the creation application, which, although do not become necessary for making the access to the file, are determined by the file type and the application and represent the characteristics of the file.

Also, according to the present embodiment, the file-access controlling CPU 1501 takes advantage of the data-holding-unit resident information. This allows the CPU 1501 to instruct the disk-array controlling CPU 1601 to cause data in a file to be resident in the CM, i.e., to cause the data in the file to be always stored in the CM. At this time, the CPU 1601 executes the disk-array control program 2502. If the CM has been already occupied by resident-specified files, this resident instruction turns out to become an instruction for storing this resident-specified file into the CM with a higher priority as compared with a file with no residence is specified. Moreover, in addition to the data in the file, the file-access controlling CPU can also instruct the disk-array controlling CPU to always store, into the CM, the index management table 2303 which will be explained later. Also, the file-access controlling CPU can instruct the disk-array controlling CPU to store a file belonging to the update time period into a disk that can access a high speed disk. The file-access controlling CPU can also specify, to the disk-array controlling CPU, the size of data in a file to be stored into a disk. Also, in correspondence with the data amount of the file of the access target and the data storage location, the file-access controlling CPU can specify, to the disk-array controlling CPU, a data amount to be read in advance from the disk to the CM.

In this way, in addition to the following information, the information such as the storage-destination media and the data-holding-unit resident information, which are based on the configuration of the storage system 1, have been stored in the file-attribute management table 2203: the information such as the file name and the directory name, which are necessary for making an access to the file, and the information such as the size, the creation application, the permission, and the data life-cycle, which indicate the characteristics of the file. The file-access controlling CPU of each CHN can instruct the disk-array controlling CPU to take into consideration both of the following characteristics and to manage the file to be stored into the storage system: the characteristics of the storage system such as the access speed to the disks, and the characteristics of the file registered in the file-attribute management table.

(8) File Creation Processing

Next, explanation will be given below concerning the steps of the file creation processing. It is assumed that the user of the client computer connected to the NAS host 100 has created a file abc.txt. The client computer transmits, to the NAS host 100, a generation request for generating the file. Having received this request, the NAS host 100 issues, to the CHN 20, a generation request for generating the file abc.txt. At this time, the generation request includes attribute information on the file abc.txt. The attribute information on the file abc.txt included in the generation request may be attached to the generation request by the client computer, or may be attached thereto by the NAS host. Also, the attribute information attached by the client computer and the one attached by the NAS host may exist in a mixed state. As the attribute information to be transmitted as the generation request, there exist the information that the file system requires, i.e., the information such as the file name and the directory name which are necessary for making an access to the file, and the information which are specific to the file type and an application in use. In the case of the generation request for generating the file abc.txt, i.e., a text file, the attribute information to be transmitted include the following information: File name "abc.txt", directory name "mydoc", file type "normal file", type "text", state "in the open", title "ABC", genre "technical document", comment "about ABC", file size "1 MB", page number "100 pages", character number "20000 characters", line number "500 lines", length "not exist", size "not exist", creation application "editor", update application "editor", display application "pager", permission "Division 4: R-, Section 2: RW- . . . ", creation point-in-time "2003/1/2 3:45", update point-in-time "2003/1/2 3:45", access point-in-time "2003/1/2 3:45", creator "Tanaka", owner "Tanaka", updator "Tanaka", viewer "Tanaka", creation group "Section 2", update group "Section 2", view group "Section 2", importance degree "high", storage-destination media "high speed disks", data hold priority-degree "high", data-holding-unit resident information "no residence is specified", user-definition attribute information "price: 10000 yen", and the like.

The CHN 20 receives the generation request from the NAS host 100 via the LAN controller 1701. Then, the file-access controlling CPU 1501 executes the file system program 2100. The request processing unit 2101 within the file system program 2100 makes reference to the file-name management table 2102, thereby checking whether or not the file abc.txt has been registered therein. Since the file abc.txt is a newly created file, the file abc.txt should not be registered yet into the file-name management table 2102. Accordingly, the request processing unit 2101 allocates a file handler to the file abc.txt, then newly registering the file name abc.txt and the allocated file handler into the file-name management table 2102. Furthermore, the file-storage management unit 2103 creates the file-storage management table 2104 corresponding to the file handler allocated to the file abc.txt.

Next, the file-access controlling CPU 1501 starts up and executes the file-attribute management program 2200, thereby making the file-attribute management table 2203 of the file abc.txt related to the file handler allocated to the file abc.txt. Subsequently, the file-attribute registration unit 2201 registers, into the file-attribute management table 2203, the attribute information on the file abc.txt included in the file generation request received from the NAS host 100.

(9) Index Creation Processing

Next, explanation will be given below concerning the steps of the index creation processing. The "index", which refers to the index of a retrieval-target file, is used for executing a high speed retrieval of the retrieval-target file.

The index creation processing in the present embodiment is executed with respect to a file access with two types of timings, i.e., synchronous and asynchronous timings. In the case where the index creation processing is executed in a state of being synchronous to the file access, there exist the following two types of cases: (1) the case where, if the CHN has accepted from the NAS host a write request for writing the file, the CHN executes a creation processing of the file or an update processing thereof in correspondence with the received write request, and further, after having executed the index creation processing, the CHN transmits to the NAS host a response to the write request; (2) the case where, if the CHN has accepted a file retrieval request from the NAS host, the CHN executes the index creation processing and a retrieval processing of the file, and returns to the NAS host a response to the file retrieval request. Meanwhile, the case where the index creation processing is executed in an asynchronous manner to the file access is the following case: after having received from the NAS host an access request for accessing the file, and having transmitted to the NAS host a response to this access request, the CHN executes the index creation processing. In this case, the index creation processing is generally executed during a time-zone during which the file-access controlling CPU 1501 is in a low-load operation and there exists no other processing to be executed.

The file-access controlling CPU executes the retrieval program 2300 with either of the above-described timings, thereby starting the index creation processing. The file-access controlling CPU executes the index creation program 2301, thereby creating the index.

Having executed the index creation program 2301, the file-access controlling CPU makes reference to the file-attribute management table 2203, thereby acquiring the information on the type, the creation application, the update application, and the display application of a file whose index is to be registered. Moreover, based on the acquired information on the type and the applications of the file, the file-access controlling CPU selects, from among the data in the file, information to be registered as the index. For example, in the case of the file abc.txt, the type is "text", and the creation application and the update application are "editor", and the display application is "pager". Consequently, words such as "data", "retrieval", "file", and "database", which appear in the body text of the file abc.txt, are selected as the information to be registered as the index. Also, in the case of a file def.mpg, the type is "motion picture". Accordingly, a length for indicating the reproduction time, i.e., a part of data in the file def.mpg, is selected as the information to be registered as the index. Furthermore, the file-access controlling CPU registers the selected information into the file-attribute management table 2203.

In addition, the file-access controlling CPU may also extract, from the file-attribute management table 2203, information that the user uses at the time of retrieving a file. Then, the CPU may generate the information as the index, then storing the index into the index management table 2303. For example, the file-access controlling CPU may also select the following information from the file-attribute management table, then storing the selected information into the index management table: If the type of an index-creation target file is "text" such as abc.txt, the title or the page number; otherwise, if the type of the index-creation target file is a music file, the creator or the like. Also, the type of the file, the data-holding-unit resident information, and the like may be registered into the index management table regardless of the type of the index-creation target file. Of course, it is also possible to leave one index management table to manage the two types of information, i.e., the index information selected from among the data in the file, and the index information selected from the file-attribute management table.

FIG. 8 illustrates one example of the index management table 2303. In the index management table 2303 in FIG. 8, information stored in an "index (contents)" field are the index information selected from among the data in the file. Information stored in an "attribute" field are names of the attributes extracted from the file-attribute management table. Information stored in an "attribute information" field are the attribute information indicating the attributes registered in the "attribute" field. Namely, in the case of the file abc.txt, from among the data in the file, i.e., the body text of the file abc.txt, the words, "data", "retrieval", "file", and "database", are registered in the index management table 2303 as the index. Meanwhile, from the file-attribute management table, "text", "100 pages", and "no residence is specified" are registered therein as "type", "page number", and "data-holding-unit resident information", respectively.

Additionally, in FIG. 8, the index information are stored into the index management table 2303 in a form that the information are sorted by the file names. However, of course, the configuration of the index management table 2303 may also be a one sorted by "index (contents)" or "attribute". Also, the file-access controlling CPU may co-use index management tables whose configurations are sorted by "file name", "index (contents)", and "attribute information", respectively.

(10) Index Retrieval Processing

Next, explanation will be given below concerning the index retrieval processing.

The index retrieval processing is started by an instruction from the NAS host 100. The NAS host 100 instructs the storage system 1 to perform the retrieval, if the NAS host receives the retrieval instruction from the user of the client computer via the LAN, or if the NAS host 100 itself makes a judgement that the retrieval be required. The NAS host 100 transmits a keyword to the storage system 1 together with the retrieval instruction.

The CHN 20 receives the retrieval instruction and the keyword from the NAS host 100 via the LAN controller 1701. Then, the file-access controlling CPU 1501 processes the data received. Having comprehended that the received data includes the retrieval instruction, the file-access controlling CPU 1501 executes the index retrieval program 2302 within the retrieval program 2300. The execution of the index retrieval program 2302 allows the file-access controlling CPU 1501 to retrieve the received keyword from the "index (contents)" field of the index management table 2303. If the CPU 1501 has found out an index corresponding to the keyword, the CPU 1501 returns all of the corresponding file names to the NAS host 100. Meanwhile, if there has existed none of the index corresponding to the keyword, the CPU 1501 returns, to the NAS host 100, the result that there exists none of the corresponding files.

If the keyword is, e.g., "database", the file-access controlling CPU 1501 retrieves whether or not "database" has been registered in the "index (contents)" field of the index management table 2303. In the case of, e.g., the index management table 2303 illustrated in FIG. 8, the word "database" has been registered in the "index (contents)" field of the file abc.txt. Accordingly, the file-access controlling CPU 1501 returns the file name abc.txt to the NAS host 100.

Incidentally, in the above-described embodiment, the example has been given where the file-access controlling CPU 1501 retrieves the "index (contents)" field of the index management table 2303 on the basis of the keyword that the CPU 1501 has received from the NAS host 100. The retrieval target, however, is not limited to the "index (contents)" field. The "attribute" field or the "attribute information" field of the index management table 2303 may also be selected as the retrieval target.

Furthermore, the file-access controlling CPU 1501 may also execute the retrieval processing in two stages as follows: of the information registered in the index management table 2303, the CPU 1501 retrieves, first of all, information on a file that is registered as "residence is specified" in the "attribute information" field of the index management table 2303. Then, the CPU 1501 reports the retrieval result to the NAS host. Moreover, if, as a response to the retrieval result, the CPU 1501 receives from the NAS host an instruction of retrieving all the files, the CPU 1501 retrieves information on the remaining files, then reporting the retrieval result to the NAS host again. Also, it can be considered that the file whose data-holding-unit resident information is "residence is specified" is controlled by the CHN so that the file will be always stored in the CM. This is because such a file must enjoy a high access-frequency. Consequently, the file for which the information of "residence is specified" has been registered in the index management table 2303 can be considered to enjoy the high access-frequency. By retrieving such a file with the highest priority and reporting the retrieval result to the NAS host, it becomes possible to shorten the retrieval time.

(11) Data Access Processing

Figure 9:
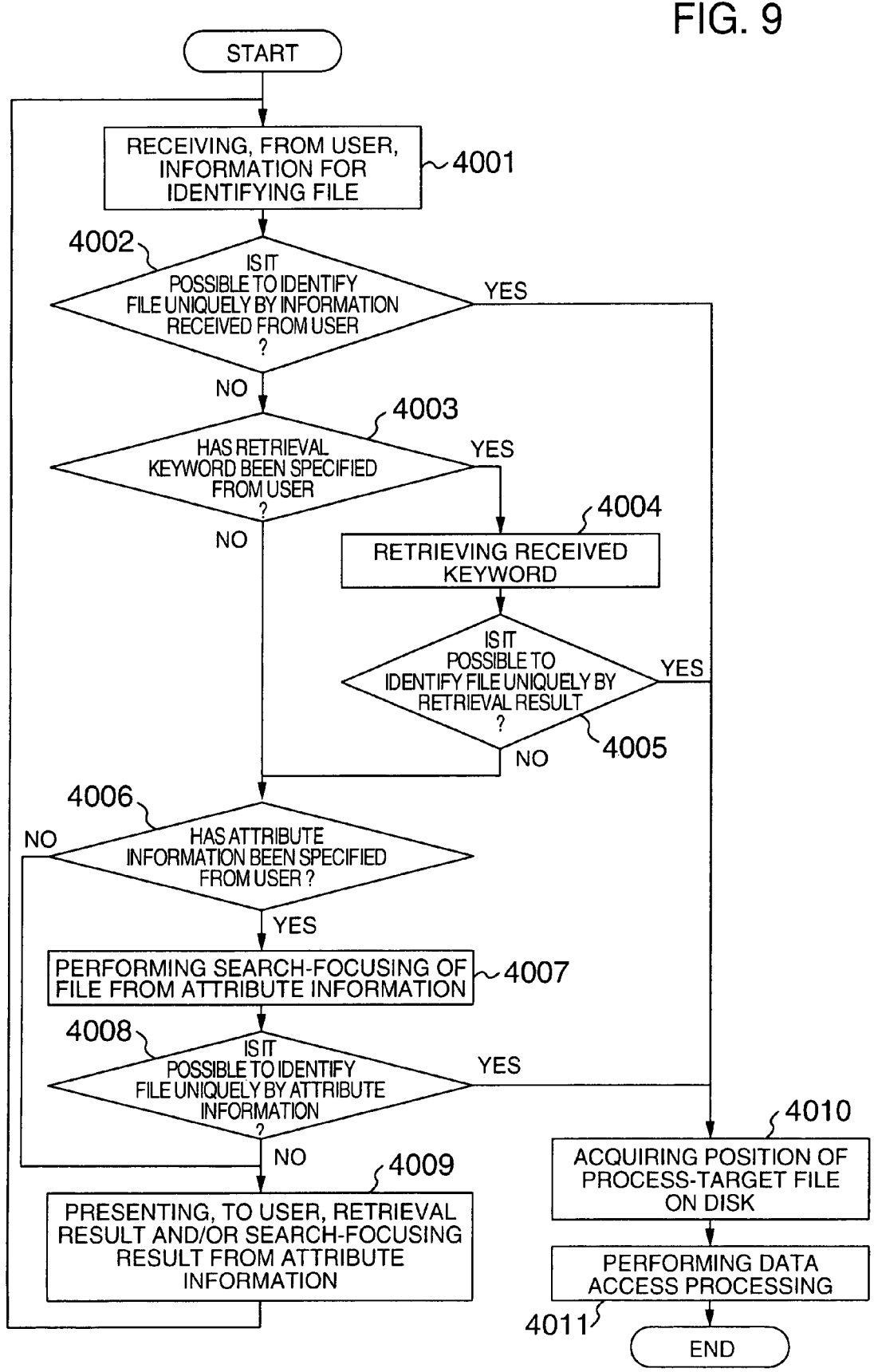
FIG. 9 is a flowchart for illustrating one example of the file-access processing steps.

Next, referring to FIG. 9, explanation will be given below concerning the data access processing in the present embodiment. FIG. 9 is a flowchart for illustrating one example of the processing steps of the data access processing in the present embodiment.

Making an access to data requires that a file that the user wishes to access be identified at first. The user of the client computer transmits an access request to the NAS host 100 via the LAN. Here, this access request includes a keyword for the file that the user wishes to open, i.e., access. Next, the NAS host transmits, to the storage system 1, this access request that includes the keyword and that the NAS host has received from the client computer. Moreover, the CHN 20 receives the access request from the NAS host, and the file-access controlling CPU 1501 judges that the keyword included in the access request is information for identifying the file. As a result, the file-access controlling CPU 1501 starts up and executes the file system program 2100 (step 4001). The execution of the file system program 2100 allows the file-access controlling CPU 1501 to analyze the above-described file-identifying information received from the NAS host. As a consequence, the CPU 1501 judges whether or not it is possible to uniquely identify the file directly by using this information (step 4002).

At the step 4002, as the case where the CPU 1501 judges that it is possible to identify the file uniquely, the following case can be considered: The user of the client computer has transmitted, to the NAS host, an access request that includes the file name as the keyword. Also, the following case can be considered: The NAS host has comprehended the management method within the storage system 1 of managing files stored in the storage system 1. Then, when the NAS host has received a keyword from the client computer, the NAS host identifies a file of the access target from the keyword. Next, the NAS host has converted the access request received from the client computer into an access request having the file name of the access target, then transmitting the latter access request to the storage system 1. As described above, if the file name has been directly specified, the processing goes to step 4010.

Meanwhile, if, at the step 4002, the file-access controlling CPU 1501 has judged that it is impossible to identify the file uniquely, the CPU 1501 starts up the retrieval program 2300, thereby executing a processing for identifying the file from the keyword included in the access request. Having started up the retrieval program 2300, the file-access controlling CPU 1501 judges whether or not a retrieval keyword capable of being registered into the "index (contents)" field of the index management table 2303, i.e., a part of data in the file, has been included in the keyword included in the access request (step 4003). If the retrieval keyword has been included therein, the CPU 1501 retrieves the received keyword from the index management table 2303 (step 4004). This retrieval processing is performed in accordance with basically the same steps as the ones in the above-described index retrieval processing.

Next, the file-access controlling CPU 1501 judges whether or not it is possible to identify the file uniquely from the result of the retrieval processing executed at the step 4004 (step 4005). If, at the step 4005, it is possible to identify the file uniquely, the file of the access target can be identified, and accordingly the processing goes to the step 4010.

If, at the step 4005, the file-access controlling CPU 1501 has judged that it is impossible to identify the file uniquely, or if, at the step 4003, the CPU 1501 has judged that the retrieval keyword has been not included in the keyword included in the access request, the CPU 1501 starts up the file-attribute management program 2200. This allows the file-access controlling CPU 1501 to judge whether or not information on an attribute of the file exists within the keyword, i.e., the file-identifying information included in the access request (step 4006). If, at the step 4006, none of the attribute information on the file exists within the keyword included in the access request, the processing goes to a step 4009.

Meanwhile, if, at the step 4006, the attribute information has been specified within the access request, the file-access controlling CPU 1501 performs a search-focusing of the access-target file from the specified attribute information and the file-attribute management table 2203 (step 4007).

This search-focusing processing is performed as follows: Based on the attribute information specified within the access request, the file-access controlling CPU 1501 extracts a file registered within the file-attribute management table 2203. For example, if information that "creator" is "Tanaka" has been specified within the access request, the CPU 1501 extracts the file for which "Tanaka" has been registered as "creator" within the file-attribute management table 2203. Also, if information of "creator is registered" has been specified within the access request, the CPU 1501 extracts a file for which attribute information on the creator has been registered within the file-attribute management table 2203. Also, if information of "update time period" has been specified within the access request, the CPU 1501 extracts a file for which information on the data life-cycle registered within the file-attribute management table 2203 indicates "update time period". In this way, the attribute information included within the access request may be the following information: A combination of the information registered in the "attribute" field of the file-attribute management table 2203 and the information registered in the "contents" field thereof, information for specifying a condition that an attribute has been registered in the file-attribute management table 2203, or the information registered in the "contents" field of the file-attribute management table 2203. Also, information on plural attributes may be included in the access request.

Moreover, the file-access controlling CPU 1501 judges whether or not it is possible to identify the file uniquely from the result of the search-focusing performed at the step 4007 (step 4008). If, at the step 4008, it is possible to identify the file uniquely, the processing goes to the step 4010.

Meanwhile, if, at the step 4008, it is impossible to identify the file uniquely, the file-access controlling CPU 1501 starts up the file system program 2100. Furthermore, in order to present, to the user of the client computer, a candidate for the access-target file extracted at the step 4004 and/or at the step 4007, the file-access controlling CPU 1501 transmits, to the NAS host, the file name of a file that has become the access-target candidate. This allows the CPU 1501 to urge the user of the client computer to transmit information for identifying the file (step 4009). Then, the processing goes back to the step 4001.

If it has been possible to identify the access-target file uniquely at each of the step 4002, the step 4005, and the step 4008, the processing goes to the step 4010. At the step 4010, the file-access controlling CPU 1501 starts up the file system program 2100. This, at the step 4010, allows the file-access controlling CPU 1501 to acquire, from the file-storage management table 2104, position information on the identified access-target file (i.e., the file to be accessed) on the disk. From the position information on the disk acquired at the step 4010, it becomes possible to determine a storage region that should be actually accessed in the access-target file. Consequently, the file-access controlling CPU 1501 instructs the disk-array controlling CPU 1601 to access data stored in this storage region. The disk-array controlling CPU 1601 starts up the disk-array control program 2502, thereby controlling the DKA so as to access the data in the file (step 4011).

Incidentally, in the present embodiment, the following processing has been performed at the step 4003 and the step 4004: The file-access controlling CPU 1501 judges whether or not the keyword included in the access request includes the information capable of being registered into the "index (contents)" field of the index management table 2303. If the keyword includes the information capable of being registered into the "index (contents)" field, the file-access controlling CPU 1501 retrieves the index management table 2303, thereby selecting the access-target file. This registration, however, is not necessarily limited to the "index (contents)" field. Namely, in the case as well where the keyword included in the access request includes the information capable of being registered into the "attribute" field or the "attribute information" field of the index management table 2303, it may be assumed that the file-access controlling CPU 1501 retrieves the index management table 2303.

According to the present embodiment, the storage system includes therein the file system program, the file-attribute management program, and the retrieval program. This configuration allows the storage system to perform the search-focusing of an access-target file by using the index management table managed by executing the retrieval program and the file-attribute management table managed by executing the file-attribute management program. As a consequence, it becomes possible to make an easy and rapid access to the access-target file.

Also, according to the present embodiment, the file-attribute management table makes it possible to manage the attribute information indicating the characteristics of a file and the attribute information relating to the configuration and characteristics of the storage system. This condition allows the file stored in the storage system to be managed while taking into consideration both of the attribute information indicating the characteristics of the file and the attribute information relating to the configuration and characteristics of the storage system.

According to the present invention, it becomes possible to enhance the access performance to a file stored in the storage system. Also, it becomes possible to manage the various types of attribute information that the file includes.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method for searching a file from a plurality of files stored in a storage system, the storage system including a plurality of disks storing the plurality of files and a controller coupled to the plurality of disks and controlling to search the file from the plurality of files according to a search request received from a computer, the method comprising the steps of:
    creating, based upon execution by the controller, an index used for searching the file by selecting a portion of a content of the file used as the index for the file, the portion of the content of the file including life-cycle information indicating one of a plurality of life-cycle periods to which the file presently belongs, the plurality of life-cycle periods including a first period during which the file is updated most frequently, a second period during which the file is referenced more frequently than updated, and a third period during which the file is accessed least frequently;
    receiving, based upon execution by the controller, the search request including a keyword regarding a certain life-cycle period;
    searching, based upon execution by the controller, the file according to the search request by retrieving indexes of the plurality of files to find out an index including the life-cycle information indicating the certain life-cycle period specified as the keyword; and
    returning, based upon execution by the controller, a file name corresponding to the index found in the searching step.

2. A method for searching the file according to claim 1, wherein the life-cycle period of each file is determined by the storage system based on frequency of an access to the file.

3. A method for searching the file according to claim 1, wherein the life-cycle period of each file is determined based on a content of the file.

4. A method for searching the file according to claim 1, wherein during the first period, the storage system stores the file into a storage region to which a high speed access is executable.

5. A program product stored on a computer-readable storage medium and being executable to perform searching a file from a plurality of files stored in a storage system, the storage system including a plurality of disks storing the plurality of files and a controller coupled to the plurality of disks and controlling to search the file from the plurality of files according to a search request received from a computer, the program product comprising:
    code for creating, based upon execution by the controller, an index used for searching the file by selecting a portion of a content of the file used as the index for the file, the portion of the content of the file including life-cycle information indicating one of a plurality of life-cycle periods to which the file presently belongs, the plurality of life-cycle periods including a first period during which the file is updated most frequently, a second period during which the file is referenced more frequently than updated, and a third period during which the file is accessed least frequently;
    code for receiving, based upon execution by the controller, the search request including a keyword regarding a certain life-cycle period;
    code for searching, based upon execution by the controller, the file according to the search request by retrieving indexes of the plurality of files to find out an index including the life-cycle information indicating the certain life-cycle period specified as the keyword; and
    code for returning, based upon execution by the controller, a file name corresponding to the index found by executing the code for searching.

6. A program product according to claim 5, wherein the life-cycle period of each file is determined by the storage system based on frequency of an access to the file.

7. A program product according to claim 5, wherein the life-cycle period of each file is determined based on a content of the file.

8. A program product according to claim 5, wherein during the first period, the storage system stores the file into a storage region to which a high speed access is executable.

9. A storage system in which a file is searched from a plurality of files stored in the storage system, the storage system comprising:
    a plurality of disks storing the plurality of files; and
    a controller coupled to the plurality of disks and controlling to search the file from the plurality of files according to a search request received from a computer, wherein the controller executes to create an index used for searching the file by selecting a portion of a content of the file used as the index for the file, the portion of the content of the file including life-cycle information indicating one of a plurality of life-cycle periods to which the file presently belongs, the plurality of life-cycle periods including a first period during which the file is updated most frequently, a second period during which the file is referenced more frequently than updated, and a third period during which the file is accessed least frequently, wherein the controller executes to receive the search request including a keyword regarding a certain life-cycle period, wherein the controller executes to search the file according to the search request by retrieving indexes of the plurality of files to find out an index including the life-cycle information indicating the certain life-cycle period specified as the keyword, and wherein the controller executes to return a file name corresponding to the index found by the controller's execution of searching the file.

10. A method for searching the file according to claim 9, wherein the life-cycle period of each file is determined by the storage system based on frequency of an access to the file.

11. A method for searching the file according to claim 9, wherein the life-cycle period of each file is determined based on a content of the file.

12. A method for searching the file according to claim 9, wherein during the first period, the storage system stores the file into a storage region to which a high speed access is executable.

* * * * *